(12) United States Patent
Jackson

(10) Patent No.: US 7,090,432 B2
(45) Date of Patent: Aug. 15, 2006

(54) SPILL RESPONSE SYSTEM

(76) Inventor: Edwin Christopher Jackson, 6601 Kelly Rd., Warrenton, VA (US) 20187

( * ) Notice: Subject to any disclaimer, the term of this patent is extended or adjusted under 35 U.S.C. 154(b) by 116 days.

(21) Appl. No.: 10/244,685

(22) Filed: Sep. 17, 2002

(65) Prior Publication Data

US 2004/0050768 A1 Mar. 18, 2004

(51) Int. Cl.
*E02B 15/06* (2006.01)
*E02B 15/04* (2006.01)

(52) U.S. Cl. .......................... 405/66; 405/67

(58) Field of Classification Search ................ 220/571, 220/572; 312/229; 405/63–72; 210/242.1
See application file for complete search history.

(56) References Cited

U.S. PATENT DOCUMENTS

| | | | |
|---|---|---|---|
| 2,682,151 A | | 6/1954 | Simpson |
| 2,697,646 A | * | 12/1954 | Craig ........................... 312/229 |
| 3,007,178 A | * | 11/1961 | Altman et al. .................. 4/525 |
| 3,321,923 A | | 5/1967 | Smith |
| 3,539,013 A | | 11/1970 | Smith |
| 3,703,811 A | | 11/1972 | Smith |
| 3,817,247 A | * | 6/1974 | Mills ........................... 604/150 |
| 3,986,959 A | * | 10/1976 | Bagot et al. .............. 210/242.4 |
| 4,102,789 A | | 7/1978 | Young |
| 4,244,819 A | | 1/1981 | Ballu |
| 4,981,097 A | | 1/1991 | Beyrouty |
| 5,135,325 A | * | 8/1992 | Eddy ............................ 405/66 |
| 5,299,886 A | * | 4/1994 | Whitaker ....................... 405/66 |
| 5,362,180 A | | 11/1994 | Canning |
| 5,522,674 A | * | 6/1996 | Cooper ......................... 405/63 |
| 5,535,775 A | * | 7/1996 | Blaine ................... 137/355.17 |
| 5,568,824 A | * | 10/1996 | Cordrey ................. 137/355.27 |
| 5,584,604 A | | 12/1996 | Osterlund |
| 5,688,075 A | * | 11/1997 | Gradek ......................... 405/69 |
| 5,885,451 A | * | 3/1999 | Porrovecchio, Sr. ...... 210/242.4 |
| 6,036,499 A | * | 3/2000 | Ford .............................. 439/4 |

OTHER PUBLICATIONS

"Aluminum" Encyclopaedia brittanica. 2004. http://www.search.eb.com/eb/article?eu=6036.*
"Crank" Encyclopaedia brittanica. 2004. http://www.search.eb.com/eb/article?eu=27203.*
"housing" Merrian-Webster's collegiate dictionary 1998.*

* cited by examiner

*Primary Examiner*—John Kreck
(74) *Attorney, Agent, or Firm*—Donna L. Angotti

(57) ABSTRACT

A spill containment and remediation system. A reel for a boom is mounted in the upper part of a weatherproof housing. The lower region of the housing is leakproof and can store recovered liquid spill. A boom or dike is mounted on the reel. The housing has an opening which is normally sealed shut by a door. The housing is configured to be mounted on the exterior of a tanker delivery truck. When a spill occurs the door is opened and the boom readily deployed through the opening. After use, the containment boom can be reeled-in and stored over the lower region of the housing.

3 Claims, 5 Drawing Sheets

SPILL RESPONSE SYSTEM

FIELD OF THE INVENTION

The present invention is in the general field of hazardous material containment and remediation. It deals with a system for rapid containment and absorption of spilled petroleum products.

BACKGROUND

Modern society is dependent on oil and gasoline and other petroleum products. These petroleum products are normally manufactured at refineries and shipped or piped to centralized facilities, necessitating a widespread distribution network to deliver the product to the consumer. The final leg of that network most often involves the delivery of gas or oil by truck. Tanker trucks routinely deliver gasoline to gas stations and deliver gas and other products such as heating oil directly to consumers. During these deliveries, the petroleum product is transferred from the tanker truck to a storage tank at the service station or at the consumer's location.

Despite the exercise of great care during these deliveries, accidental spills of some petroleum products occur frequently. Such uncontrolled release of even small quantities of gasoline or oil into the environment can have negative environmental and financial consequences.

In the distant past, small spills were commonly just dispersed by washing the spilled product away with water, for instance from a garden hose. The spilled product would typically be washed down a storm drain or into a ditch The severe adverse environmental consequences of such dispersals have been recognized and today such practices are strictly forbidden. Spills must be contained and they must be contained quickly and cleaned-up in an environmentally safe manner.

A number of products to mitigate spills are commercially available. These include loose absorbents such as peat and clay, various types of manufactured absorbent pads and socks and various booms which confine and/or absorb spills. Service stations typically utilize these products and tanker delivery trucks often carry one or more of them.

Spills spread quickly and the ultimate effectiveness of any type of spill remediation device is directly related to the speed with which it can be deployed. Containing a spill before it reaches a storm drain, waterway, soil or ignition source is critical. A quick response to a spill is vital. Socks or booms or other absorption and containment media which are typically stored away in seldom accessed locations or out of the way places require time to locate and time to place in use rendering them only minimally effective in actual spill containment situations.

A need exists for a system for rapid deployment of spill containment and remediation devices.

SUMMARY OF THE INVENTION

The invention includes a housing for mounting on a delivery tanker truck. The housing has a reel mounted in an upper interior region for storing, deploying, and retrieving an elongated spill absorption or diking device such as a boom or dike. The lower part of the interior of the housing functions as a storage area particularly for recovered spilled product. The lower region located generally beneath the reel is leakproof so that it can contain recovered liquid spill matter for holding and transport to a safe disposal location. The housing has an opening which is normally sealed by a weather tight door. When a spill occurs, the door is opened and the boom, or dike, is unreeled and pulled-out of the housing for placement in a position to absorb or block the spill. The boom, or dike, is attached to the reel by a cable or rope. The sides, and bottom, of the opening have rollers so that the boom can easily move over them. In a preferred embodiment, the reel has a manual crank mounted on its exterior. The reel could be turned by a motor such as a pneumatic or explosion proof electric motor.

It is an object of the invention to provide apparatus enabling a quick response to a spill.

It is another object of the invention to provide apparatus having a boom or dike on a reel ready for quick deployment and easy retrieval.

It is an object of the invention to provide apparatus having a boom on a reel and a leakproof storage area in the same housing with the reel for holding recovered spill.

It is an object of the invention to provide a device to provide for the transport of spill containment devices in a readily accessible manner.

It is an object of the invention to provide for the easy retrieval and storage of booms or dikes contaminated by spill.

DETAILED DESCRIPTION

Figure 1:
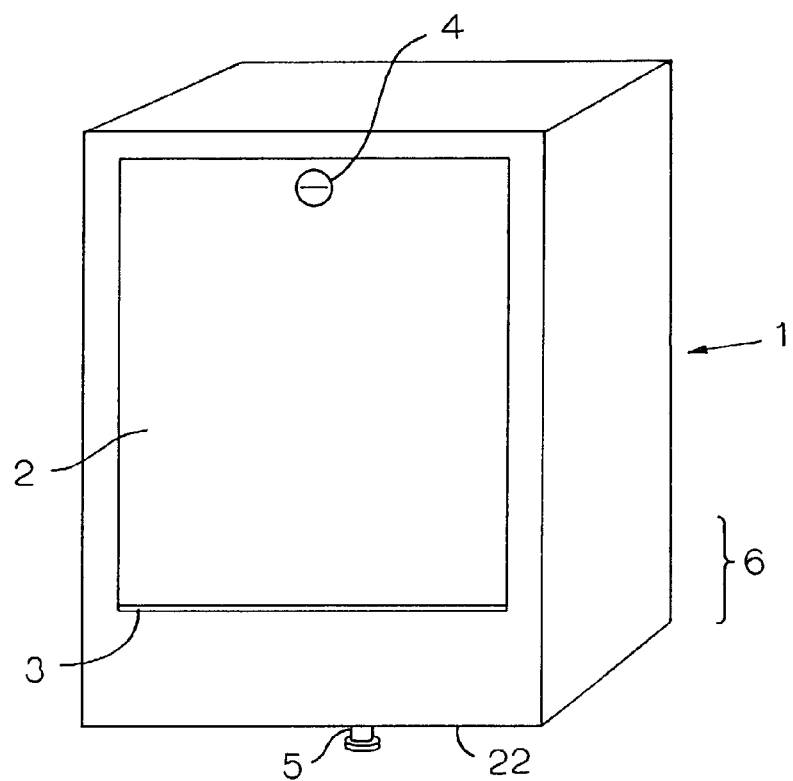
FIG. 1 is view of a housing with the door closed.

FIG. 1 shows an example of one embodiment of a spill containment and remediation apparatus. The device includes a housing, item 1. The housing has a door, item 2 appropriately hinged at its bottom end item 3. Item 4 is a latch for use in opening and closing the door. Item 5 is a drain, with a plug or a shutoff valve. Item 6 designates a lower part of housing 1.

Figure 2:
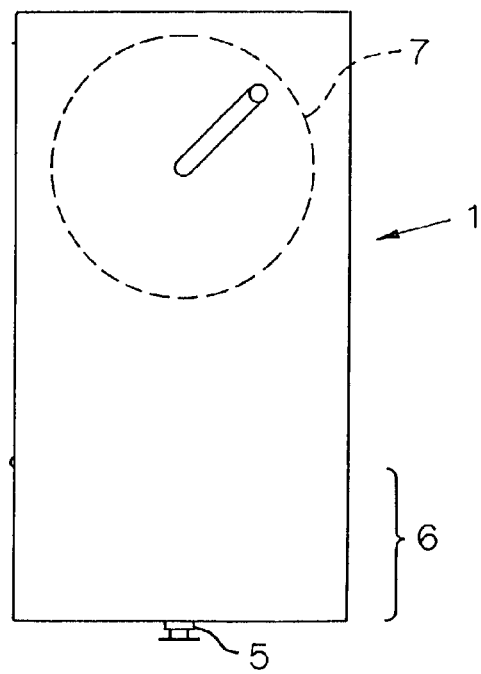
FIG. 2 is a side view of a housing.
Figure 3:
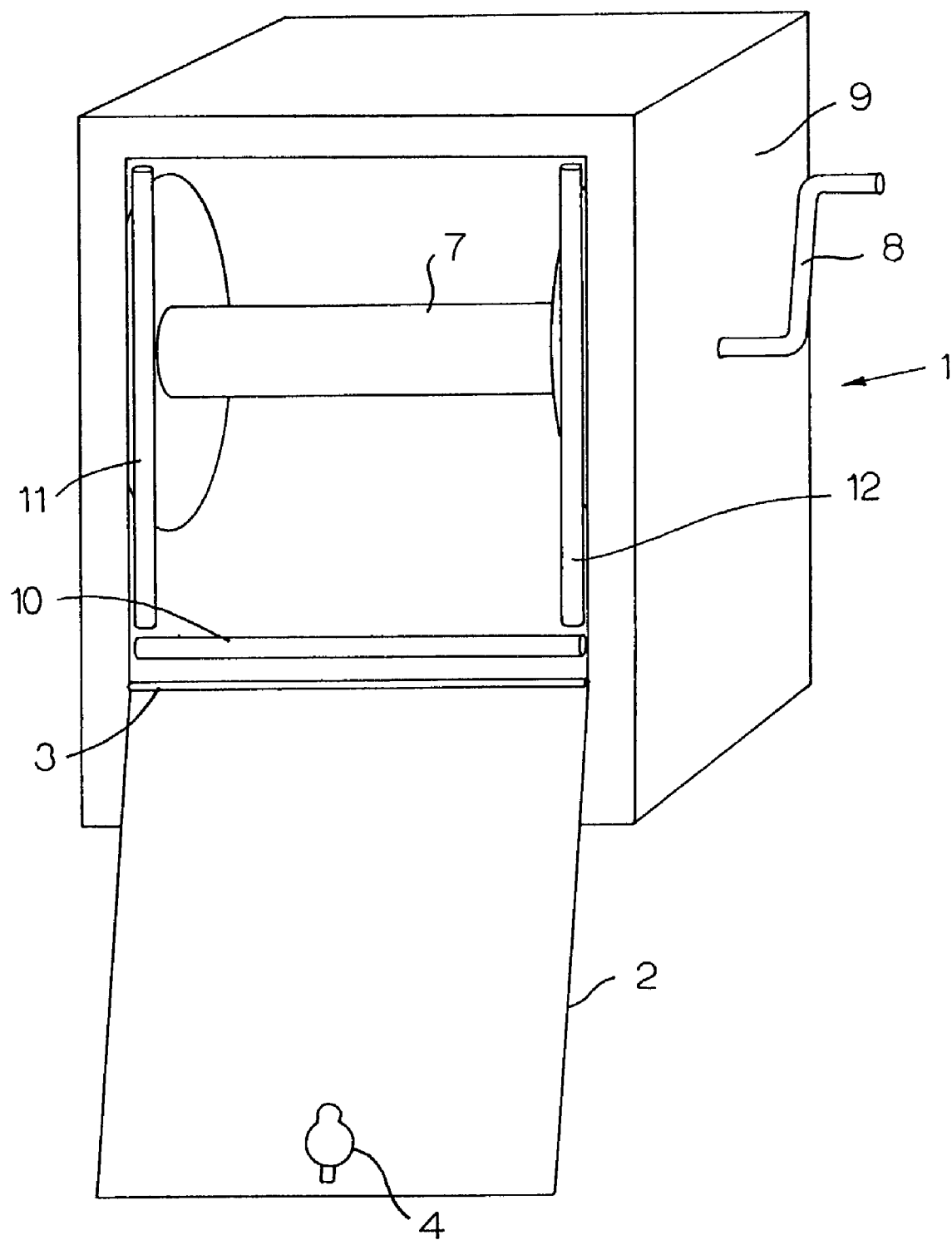
FIG. 3 is a view of a housing with the door opened.

FIG. 2 is a side view of the housing 1 of FIG. 1. A reel 7 which is mounted inside the housing 1 is shown in phantom. The reel can be turned manually or by motor. If a motor is used, it preferably is a pneumatic or explosion proof motor. FIG. 3 is a perspective view of the housing 1 with the door opened and hanging down. In the interior of the housing a reel item 7 is mounted.

In this embodiment, which is a preferred embodiment, the reel 7 is mounted in the upper part of the housing. The reel 7 also has a crank 8 in operative contact with it so that the reel can be manually operated from outside the housing. The crank 8 extends through the side wall 9 of the housing 1. A weather tight seal is provided at the point where the crank enters the housing. Item 10 is a roller. The roller provides some support for anything such as a boom or diking device or cable which is being wound onto reel 7. It primarily prevents binding with the lower edge of the opening for door 2. Item 11 is a vertically mounted roller. It prevents the item which is being wound onto reel 7 or being unwound off of reel 7 from binding with the side edge of the opening in housing 1 for door 2. Item 12 is another vertically mounted roller. It avoids binding or other undesirable contact with the other side edge of the opening in housing 1.

As shown in FIG. 3, door 2 preferably opens all the way down to avoid obstruction of the spill response activity. It should be noted that door 2 could be appropriately hinged to open to either side of open up as opposed to opening down. Door 2 could also be configured to be completely removable so that it could be placed entirely out of the way if desired. If the door is configured to be completely removable, it could be tethered to the housing or truck to avoid its misplacement. Door 2 also has sealing strips, not shown, along the inside edges to insure that the housing is weather tight when the door is closed.

It is important to make the housing weather tight. Disposal of recovered spill product is expensive. The larger the volume of that product, the greater the expense. If, for instance, rain or snow enters the interior of the housing, it will mix with and increase the volume of the recovered product thus increasing the cost of disposal.

Figure 4:
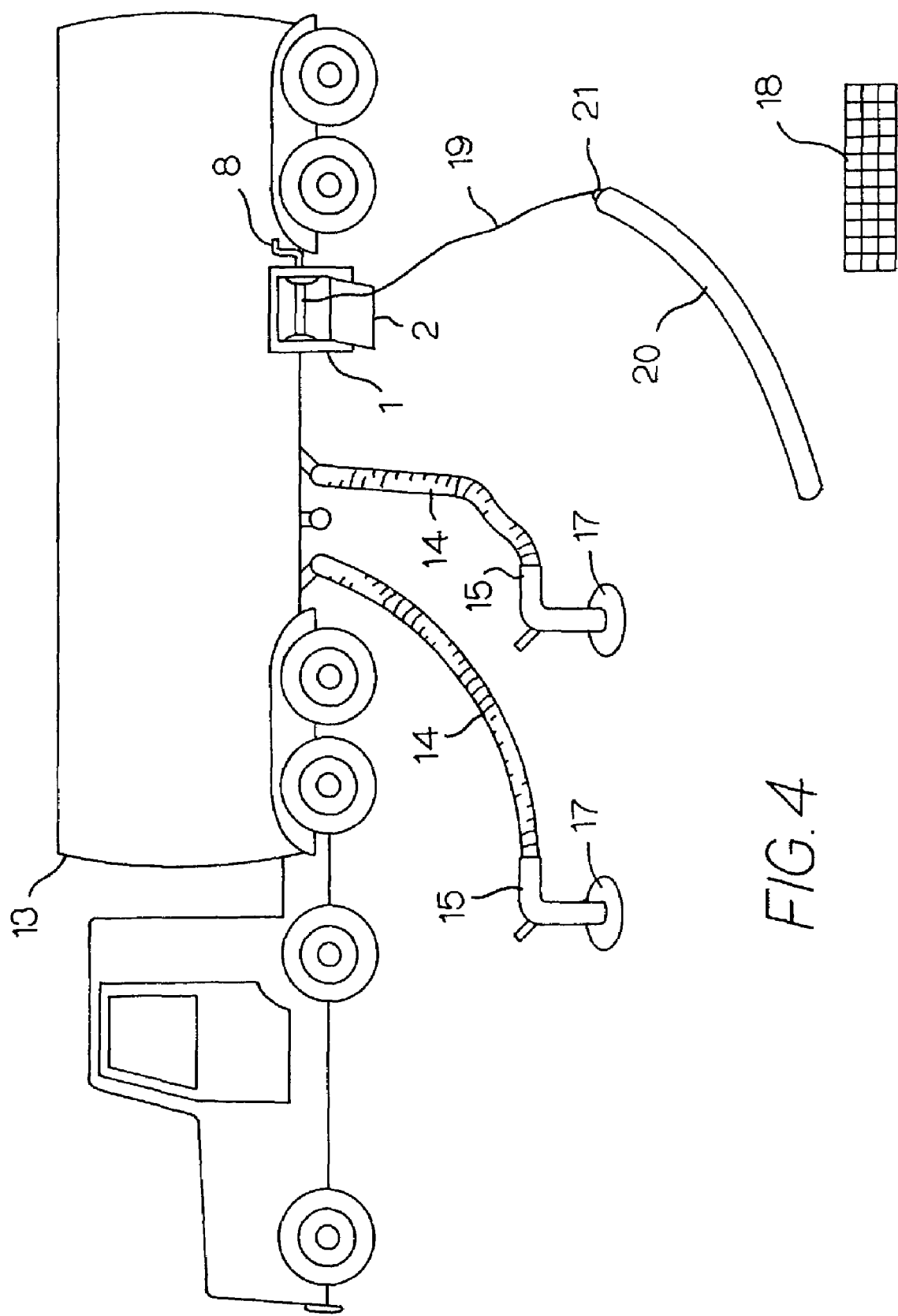
FIG. 4 is an illustration showing the housing mounted on a truck with the boom, of dike, deployed.

FIG. 4 depicts the housing item 1 being used in a petroleum delivery environment. Item 13 is a petroleum delivery tanker truck. Item 14 is a product delivery hose and item 15 is a delivery elbow designed to couple with service station fills item 17. Item 18 represents a drain such as a storm drain or sewer etc. Item 19 is a cable or rope, preferably a plastic coated cable, which is attached at one end to the reel inside housing 1. The cable is windable onto the reel 7. The other end of the cable or rope item 19 is attached to a section of spill boom, or diking device, item 20. Item 21 is a quick connect clip or some other type of easy to connect and easy to disconnect attachment or latching so that the boom 20 can be readily attached to or disconnected from cable or rope 19. A quick connect clip is also used to attach item 19 to the reel.

In FIG. 4 the boom, or diking device, item 20 is shown deployed as it might be in a typical real or potential spill situation. It is placed between the potential source of a spill and the drain 18. The highest potential sources of the spill in this case are the tanker truck 13, the product delivery hoses 14 and the service station fills 17. The section of boom 20 is designed to absorb the petroleum product or to simply block passage of the petroleum product or to both absorb and block passage of the petroleum product. In this case, it is important not only to contain and remove as much of the spilled product as possible but also to prevent any part of it from reaching the drain 18.

Prior to deployment, the cable 19 and the section of boom 20 were both wound-up on the reel and stored in the housing 1 ready for quick deployment. See FIG. 5. In this case the housing 1 is shown mounted on the delivery truck 13. It could be permanently attached to the truck or mounted in a fashion so that the housing 1 could be removed and possibly transferred to another tanker truck, permanently or temporarily. The housing also could be placed at any particular location especially in locations having high potential for spills such as service stations. Other locations warranting permanent or semi-permanent placement of a housing might be any location where any spill, no matter how small, would pose a particular hazard such as near a pristine waterway. The housing can be easily mounted to any rigid structure such as a wall, a pole or a supporting column.

It is contemplated that this spill response system may also be deployed in a preventative manner due to its ease of use. That is, at delivery locations, prior to transfer of product the boom or dike will be deployed as a preventive measure. After product transfer, the boom, or dike, will simply be re-wound onto the reel and be ready for use at the next locations.

Figure 5:
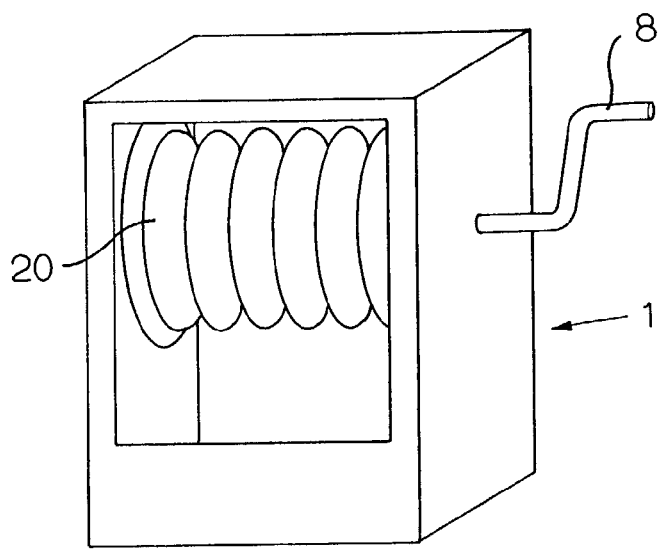
FIG. 5 is a view of a housing with the door removed and a boom wound on the reel.
Figure 6:
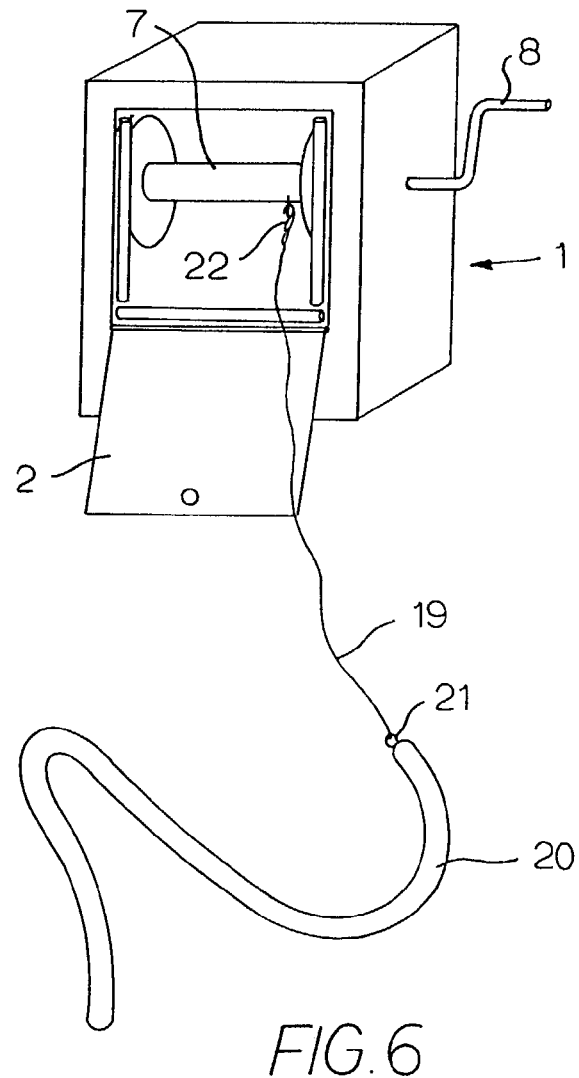
FIG. 6 is a view of a housing with a door opened downwards and a boom, or dike, deployed.

FIG. 5 shows the housing 1 with a section of boom item 20 on the reel. The door and rollers have been omitted from this figure for clarity. The boom as mounted is ready for speedy manual deployment. The user simply grabs the end of the boom, pulls it out of the housing and takes it to the spill or to a potential spill location. FIG. 6 is an illustration of the housing 1 with door 2 open and the boom 20 out of the housing. Cable or rope 19 can be attached to reel 7 using a quick connect clip or latch item 22. This arrangement permits easy detachment and removal of cable 19 and boom 20 and replacement with another cable and boom. After boom section 20 has been deployed and presumably has made contact with and possibly absorbed the spilled product it is easily returned to its storage place in housing 1 by reeling.

Refer back to FIG. 1 and, in particular, to the lower region of the housing designated by item 6. This lower region generally extends from the lower edge of the opening in the housing to the bottom 22 of the housing. This lower region provides an important capability. It acts as a holding tank or sump for recovered spill product. The entire housing 1 is made weatherproof and the lower region 6 is made leak-proof.

After the boom, or diking device 20 is deployed and the spill is removed, the boom can be rewound onto the reel 7 taking the contaminated boom back into the housing 1. If the boom 20 is the type which absorbs the spilled petroleum product, that recovered product will be carried into housing 1 along with the boom. If some of the recovered product escapes for the boom on the reel inside housing 1, it will drop into the lower region 6 of the housing where it will be held until the user is ready to drain it out for safe disposal. Since housing 1 is usually mounted on a delivery truck, the recovered spill product can remain in the housing until the truck transports it to an appropriate location for approved disposal. This is especially convenient for a delivery truck which may not be able to go directly to a disposal site. Once at the disposal site, the recovered spill can be conveniently removed via drain 5. The contaminated boom, or dike, 20 can also be removed if desired by detaching it by clip 21. If desired a new boom could be wound onto the reel 7 and the delivery truck, within a matter of minutes, would be ready to return to service with a fresh spill response package on board.

Figure 7:
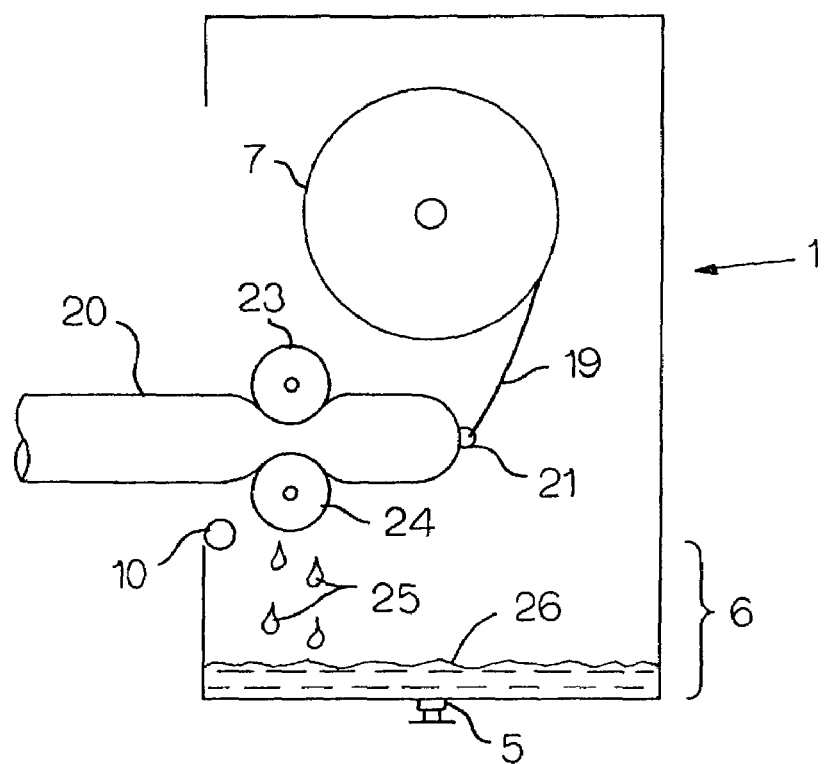
FIG. 7 is a diagram to illustrate how a boom could be squeezed to remove spilled product.

The lower region 6 can also be used to transport other types of spill response items such as absorbent pillows, absorbent mats, loose absorbents such as peat or clay, etc. After a spill is cleaned-up any of these absorbent products containing recovered spill could simply be returned to the region 6 of the housing for holding and transport to an approved disposal site after the recovered product is removed from them, usually by squeezing. A pair of rollers could be added inside the housing preferably just beneath and forward of the reel to enable the user to squeeze the recovered product out of the boom as the boom is being re-wound onto reel 7. To implement such a process, two or more rollers would be spaced apart less than the diameter of the boom. The boom would be pulled through the space between the rollers, thus squeezing the boom and causing release of the recovered spill product. FIG. 7 illustrates this process. Boom 20 would be pulled between rollers 23 and 24 by cable 29. Boom 20 would be squeezed by rollers 23 and 24 thus releasing the recovered spill product 25 which would accumulate in a liquid pool 26 in the bottom of region 6.

It should be noted that the boom could be pulled through the rollers in either direction. In one direction, a boom holding spilled product would be pulled by cable 19 through the rollers as cable 19 and boom 20 were wound onto the reel. Also during the normal operation of the housing and reel, it is anticipated that a contaminated boom holding recovered spill product could and usually would be wound directly onto the reel bypassing the rollers 23, 24. In that case, if desired, the boom could be squeezed as it was removed from the reel simply by passing it through rollers such as 23, 24. The recovered product would drip down and be collected in the bottom of region 6. Or the contaminated boom on the reel could simply be removed from the reel without passing through the rollers and be processed in an appropriate manner elsewhere. Rollers such as 23 and 24 could be mounted inside housing 1 by attaching them to the sidewalls or to brackets attached to any of the walls or bottom. The rollers are shown in the figure large enough to easily illustrate the invention but in practice may be smaller in diameter. The actual size of the rollers would be selected depending upon the size and type of boom being used.

The housing is preferably made of aluminum due to its strength and light weight. It could also be made of other metals such as steel or of any material having sufficient strength and which would not pose an ignition hazard.

Apparatus to effect even winding of the cable or boom onto the reel could be added such as a cable or boom guide which travels back and forth in front of the reel as it is being wound-in.

Sometimes during the use of the device it may be discovered, especially after pulling the boom completely out of the housing, that the cable is too short to permit the boom or dike to reach a desired deployment location. In those instances it may be desirable to disconnect the cable at the reel to allow the boom or dike to reach the desired location. To make such a disconnection a lone user would need to walk back to the housing and manually make the disconnect.

Figure 8:
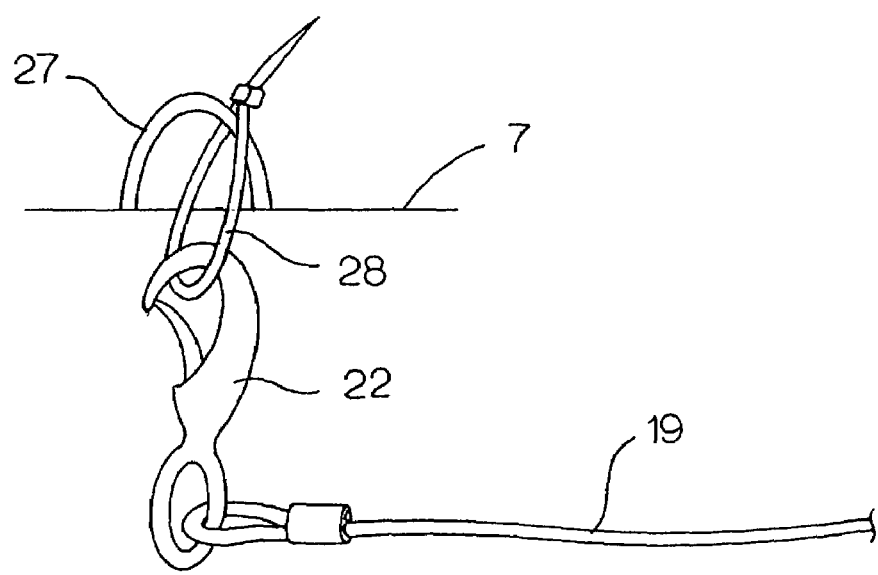
FIG. 8 is a diagram illustrating one method of attaching the cable to the reel using a break-away connection.

To allow the disconnect to be made without walking back to the housing and thus greatly speeding-up deployment, an optional break-away feature disclosed below can be used. FIG. 8 illustrates one way to implement such a feature. Item 27 is a generally U-shaped projection from the spool of reel 7. The normal function of item 27 is to provide a point to attach cable 19 to reel 7. In FIG. 8 cable 19 is attached via a quick connect clip item 22 to a break-away device item 28.

Breakaway device item 28 connects the quick connect clip 22 to the reel 7 at connection point 27. Break-away device 28 is preferably a small diameter elongated plastic strip or strand such as cable tie which will break if sufficient pulling force is applied to it by pulling on cable 19. Breakaway device 28 will be selected to break at a pulling force much less than would be necessary to break any of items 19, 22 or 27. But the force necessary to break item 28 will also be selected to be greater than the force which would be applied to cable 19 during the normal deployment and retrieval of the boom or dike. To use the break-away feature the user will simply exert added force on the boom or dike or cable until the pulling force becomes great enough to break the break-away connection item 28. Thus, the user will be able to deploy the boom or dike at a greater distance without having to waste time walking back to the housing.

After use of the boom or dike the quick connect clip 22 could be attached to item 27 so that the cable and boom or dike could be reeled-in.

Another break-away connection 28 can be easily installed to re-attach the cable to the reel. Small plastic cable ties are commercially available and work well. They are inexpensive and can be installed quickly and simply disposed-of after use. Other items could be used as break-away ties including string, wire, etc.

The exact manner by which the housing is mounted to a truck or other device will depend upon the particular structure of the truck or device.

While this invention has been disclosed in connection with what is presently considered to be the preferred embodiments, it should be understood that the invention is not limited to the disclosed embodiments but is intended to cover various modifications and equivalent arrangements included within the spirit and scope of the appended claims.

I claim:

1. A spill response system comprising:
    a housing having an upper interior region and a lower interior region;
    a reel for a boom mounted inside said housing;
    said lower interior region of said housing being capable of holding spill products; and
    said boom being operatively connected to said reel by a breakaway connection so that said boom can be disconnected from said reel by a user at a location remote from said reel.

2. A petroleum spill containment and recovery system comprising:
    a housing having an upper interior region and a lower interior region in fluid communication with said upper interior region;
    a reel for reeling a boom or dike mounted in said upper interior region of said housing; and
    said lower interior region of said housing being leakproof and having space for holding recovered spill material; and further
    wherein said upper interior region of said housing and said lower interior region of said housing are integrally formed.

3. A petroleum spill containment and recovery system comprising:
    a housing having an upper interior region and a lower interior region in fluid communication with said upper interior region;
    a reel for reeling a boom or dike mounted in said upper interior region of said housing;
    said lower interior region of said housing being leakproof and having space for holding recovered spill material; and
    wherein a boom is detachably connected to said reel, the boom is connected to said reel by a detachable cable, and said cable is connected to said reel by a break-away connection.

* * * * *